United States Patent [19]

Mark, deceased et al.

[11] Patent Number: 4,677,184

[45] Date of Patent: Jun. 30, 1987

[54] POLYCARBONATE CONTAINING CYCLOALKENYLPHENYL TERMINAL GROUPS

[75] Inventors: Victor Mark, deceased, late of Evansville, Ind., by Carol M. Mark, legal representative; by Ester H. Mark, legal representative, Springville, N.Y.

[73] Assignee: General Electric Company, Mt. Vernon, Ind.

[21] Appl. No.: 797,259

[22] Filed: Nov. 12, 1985

[51] Int. Cl.$^4$ .............................................. C08G 63/62
[52] U.S. Cl. ..................................... 528/198; 528/196
[58] Field of Search ................................ 528/198, 196

[56] References Cited

U.S. PATENT DOCUMENTS 4,518,747  5/1985  Stix et al. ............................ 528/198

Primary Examiner—Harold D. Anderson

Attorney, Agent, or Firm—Myron B. Kapustij; Martin B. Barancik

[57] ABSTRACT

Thermoplastic aromatic polycarbonate containing the polymerized reaction products of (i) at least one dihydric phenol, (ii) a carbonate precursor, and (iii) at least one end capping agent represented by the general formula

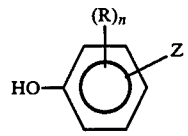

wherein:
R is independently selected from alkyl radicals;
Z is a cycloalkenyl radical; and
n is an integer having a value of from 0 to 4 inclusive.

16 Claims, No Drawings

POLYCARBONATE CONTAINING CYCLOALKENYLPHENYL TERMINAL GROUPS

BACKGROUND OF THE INVENTION

The importance of end-capping or terminating polycarbonates with certain end or terminal groups is well known. Polycarbonates which are not so end-capped are generally insufficiently heat stable since the free phenolic end groups provide reactive sites which are generally detrimental to the thermal stability of the polycarbonate. Well known and conventionally used end-capping agents include phenol compounds such as p-tertiary-butyl phenol, chroman-I, and phenol itself.

The prior art also describes other types of compounds that are effective end-capping agents for the carbonate polymers. These end-capping agents include the alkylphenols disclosed in U.S. Pat. No. 4,269,964 and Japanese Patent Publication No. 34992/76; the alkanol amines disclosed in U.S. Pat. No. 3,085,992; the imides disclosed in U.S. Pat. No. 3,399,172; aniline and methyl aniline as disclosed in U.S. Pat. No. 3,275,601; and the primary and secondary amines disclosed in U.S. Pat. No. 4,001,184. Some other end-capping agents described in the prior art include the aromatic amines disclosed in U.S. Pat. No. 3,028,365; and the ammonium compounds, ammonia, primary cycloalkyl amines, and primary aliphatic or aralkyl amines disclosed in U.S. Pat. No. 4,111,910.

However, according to Schnell, *Chemistry and Physics of Polycarbonates* (1964), page 138, ammonium hydroxide and amines saponify polycarbonates back to the monomers. This is supported by Bolgiano in U.S. Pat. No. 3,223,678 wherein it is disclosed that small amounts of amines such as monoethanolamine and morpholine break or degrade polycarbonates into lower molecular weight polycarbonates. Thus, this area of chemistry is generally not completely understood, and is one where the empirical approach is still generally used to determine whether a particular compound or class of compounds will function as an effective end-capping or chain terminating agent for polycarbonates. This area is further complicated by the fact that even though a particular compound may function as an effective terminal or end group for polycarbonates, its presence in the polymer chain may adversely affect some of the advantageous properties of the polycarbonate.

SUMMARY OF THE INVENTION

The instant invention is directed to polycarbonates containing novel terminal or end groups. More particularly, the instant invention is directed to polycarbonates containing cycloalkenylphenyl end or terminal groups.

DESCRIPTION OF THE INVENTION

In accordance with the instant invention there are provided polycarbonates which contain cycloalkenylphenyl terminal or end groups. These polycarbonates exhibit good thermal properties, e.g., thermal dimensional stability.

The cycloalkenylphenyl terminal or end groups of the instant invention may be represented by the general formula

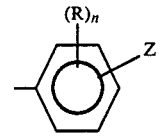

wherein:

R is independently selected from alkyl radicals;

Z is a cycloalkenyl radical containing from 5 to about 16 ring carbon atoms; and n is an integer having a value from 0 to 4 inclusive.

The alkyl radicals represented by R are preferably those containing from 1 to about 5 carbon atoms. These alkyl radicals may be straight chain or branched alkyl radicals. Some illustrative nonlimiting examples of these alkyl radicals include methyl, ethyl, propyl, isopropyl, butyl, tertiarybutyl, pentyl, and neopentyl.

The preferred cycloalkenyl radicals represented by Z are those containing from 6 to about 16 ring carbon atoms, more preferably from 10 to about 16 ring carbon atoms, and most preferably from 12 to about 16 ring carbon atoms.

These cycloalkenyl radicals are monounsaturated, i.e., they contain one double bond in the ring.

Preferred cycloalkenyl radicals are those represented by the formula

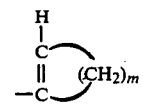

wherein m is an integer having a value from 3 to 14, preferably from 4 to 14, more preferably from 8 to 14, and most preferably from 10 to 14.

Thus the preferred cycloalkenylphenyl groups of Formula I are those represented by the formula

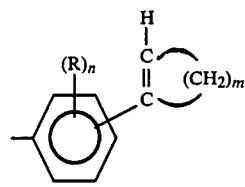

wherein R, n, and m are as defined hereinafore.

Particularly useful cycloalkenylphenyl groups of Formula III are those represented by the general formula

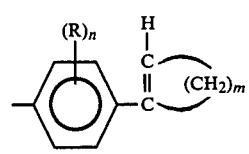

wherein R, n and m are as defined hereinafore.

The cycloalkenylphenyl terminal groups of the instant invention are provided by cycloalkenylphenols represented by the general formula

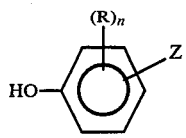            V.

wherein R, n and Z are as defined hereinafore.

The preferred cycloalkenylphenyl groups of Formulae III and IV are provided by cycloalkenylphenols represented by the formulae

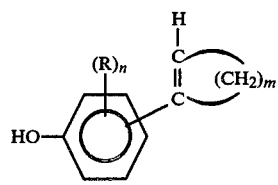    VI.

and

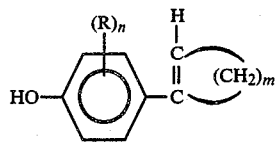    VII.

respectively, wherein R, n and m are as defined hereinafore.

The cyloalkenylphenols of Formula V, including those of Formulae VI and VII, are well known in the art. They are commercially available or may be readily prepared by known methods. One method of preparing the cycloalkenylphenols of the instant invention, particularly those of Formula VII, involves the base catalyzed cracking of cycloalkylidene bisphenols. The base catalyzed cracking of cycloalkylidene bisphenols to produce the instant cycloalkenylphenols may be represented by the following reaction scheme

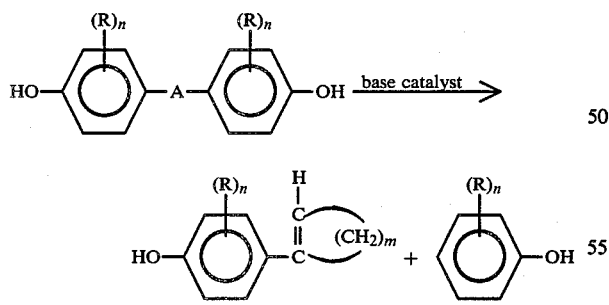

wherein R, n, and m are as defined hereinafore, and A represents a cycloalkylidene radical containing from 5 to about 16 ring carbon atoms.

The base catalyst used includes the alkali and alkaline earth metal hydroxides, alkali metal carbonates, alkali metal hydrogen carbonates, and the like.

Some illustrative non-limiting examples of cycloalkenylphenol end-capping or chain terminating agents of the instant invention are set forth in Table I.

TABLE I

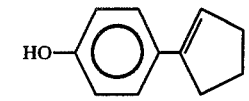

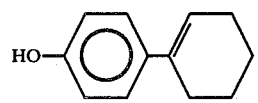

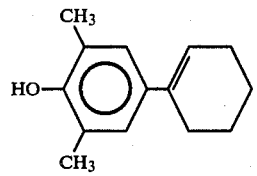

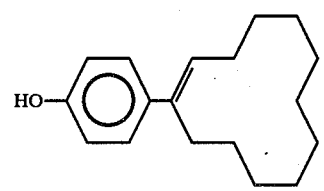

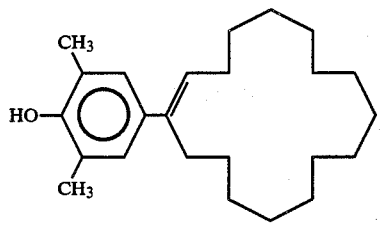

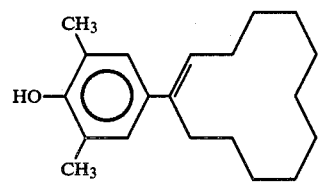

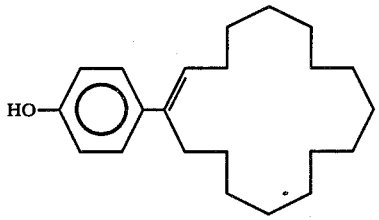

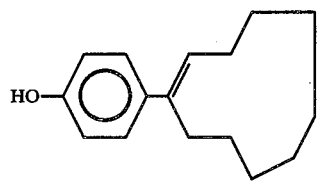

The polycarbonate resin of the instant invention contains at least one cycloalkenylphenyl terminal or end group of Formula I. These carbonate resins may be conveniently prepared by a number of different well known and conventional methods. One of these methods includes introducing an end-capping or chain terminating amount of at least one compound of Formula V into the polymer forming reaction as one of the reactants. These polycarbonate forming reactions are well known in the art and include such conventional processes as the interfacial polymerization reaction, the pyridine process, and melt polymerization.

In general these reactions involve reacting (i) at least one dihydric phenol, (ii) a carbonate precursor, and (iii) an end-capping amount of at least one end-capping agent of Formula V.

The amount of the cycloalkenylphenol of Formula V employed is a chain terminating or end-capping amount. By end-capping or chain terminating amount is meant an amount effective to form polycarbonates of a molecular weight exhibiting a useful range of physical properties. That is to say an amount effective to terminate the chain length of the polymer before the molecular weight of the polymer becomes too high and consequently the polycarbonate resin becomes too viscous for any practical application, but insufficient to terminate the polymer chain before a polycarbonate of useful molecular weight is formed. Generally, this amount is from about 0.1 to about 10 mole percent based on the amount of dihydric phenol used, and preferably from about 0.5 to about 7 mole percent.

In carrying out the instant invention only one cycloalkenylphenol may be used. In this case substantially all of the end or terminal groups will be the same. Alternatively, a mixture of two or more different chain terminating agents of Formula V may be employed. In this instance, assuming that these different cycloalkenylphenols exhibit generally equivalent reactivities, a statistical mixture of carbonate polymers containing different end or terminal groups will result.

The high molecular weight aromatic polycarbonate resins are well known compounds which are described, along with methods for their preparation, inter alia, in U.S Pat. Nos. 3,989,672, 3,275,601 and 3,028,365, all of which are incorporated herein by reference.

They may be conveniently prepared by the reaction of at least one dihydric phenol and a carbonate precursor. The dihydric phenols employed in the practice of the instant invention may be represented by the general formula

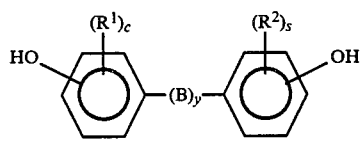

VIII.

wherein:

$R^1$ is independently selected from halogen, monovalent hydrocarbon, and monovalent hydrocarbonoxy radicals;

$R^2$ is independently selected from halogen, monovalent hydrocarbon, and monovalent hydrocarbonoxy radicals;

B is selected from divalent hydrocarbon radicals,

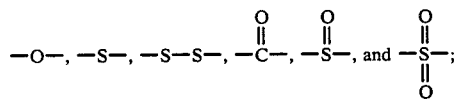

c and s are independently selected from integers having a value of from 0 to 4 inclusive; and y is either zero or one.

The monovalent hydrocarbon radicals represented by $R^1$ and $R^2$ include the alkyl, aryl, cycloalkyl, alkaryl and aralkyl radicals.

The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, biphenyl and naphthyl. The preferred aralkyl and alkaryl radicals are those containing from 7 to about 14 carbon atoms.

The preferred halogen radicals represented by $R^1$ and $R^2$ are chlorine and bromine.

The monovalent hydrocarbonoxy radicals represented by $R^1$ and $R^2$ may be represented by the formula $-OR^3$ wherein $R^3$ is a monovalent hydrocarbon radical of the type described hereinafore. Preferred hydrocarbonoxy radicals are alkoxy and aryloxy radicals.

The divalent hydrocarbon radicals represented by B include the alkylene, cycloalkylene, alkylidene, and cycloalkylidene radicals. The preferred alkylene radicals are those containing from 2 to about 30 carbon atoms. The preferred alkylidene radicals are those containing from 1 to about 30 carbons. The preferred cycloalkylene and cycloalkylidene radicals are those containing from 6 to about 16 ring carbon atoms.

Some illustrative non-limiting examples of suitable dihydric phenols include:
2,2-bis(4-hydroxyphenyl)propane (bisphenol-A);
2,2-bis(3,5-dimethyl-4-hydroxyphenyl)propane;
2,2-bis(3,5-dibromo-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)cyclododecane;
1,1-bis(4-hydroxyphenyl)decane;
1,4-bis(4-hydroxyphenyl)butane;
p,p'-dihydroxydiphenyl;
bis(4-hydroxyphenyl)ether; and
4,4'-thiodiphenol.

Other useful dihydric phenols are described, inter alia, in U.S. Pat. Nos. 3,028,365, 2,999,835, 3,148,172, 3,271,368, 2,991,273, 3,271,367, 3,208,078, 3,014,891 and 2,999,846, all of which are incorporated herein by reference.

The carbonate precursors employed in the practice of the instant invention include the carbonyl halides, the bishaloformates, and the diarylcarbonates. The carbonyl halides include carbonyl bromide, carbonyl chloride, and mixtures thereof. Typical of the diarylcarbonates are diphenyl carbonate; di(halophenyl)carbonates such as di(chlorophenyl)carbonate, di(bromophenyl) carbonate, di(trichlorophenyl)carbonate, and di(tribromophenyl)carbonate; di(alkylphenyl) carbonates such as di(tolyl)carbonate; di(naphthyl) carbonate; di(halonaphthyl)carbonates; and naphthyl phenyl carbonate. The bishaloformates suitable for use herein include the bishaloformates of dihydric phenols such as the bischloroformates hydroquinone and bisphenol-A; the bishaloformates of glycols such as the bischloroformates of ethylene glycol, neopentyl glycol, and polyethylene glycol.

The polycarbonates of the instant invention contain at least one recurring structural unit represented by the general formula

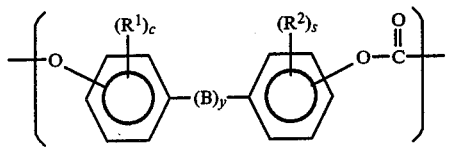

wherein $R^1$, $R^2$, B, c, s, and y are as defined hereinafore.

The polycarbonates of the instant invention also contain at least one terminal or end group represented by the general formula

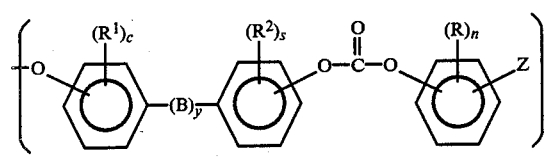

wherein $R^1$, $R^2$, R, B, n, c, s, y and Z are as defined hereinafore.

In a preferred embodiment the instant polymers contain two moles of end or terminal groups per mole of carbonate polymer.

Another embodiment of the instant invention involves using the cycloalkenylphenol end-capping agents of Formula V in conjunction with conventional known end-capping or chain terminating agents such as chroman-I, phenol, and p-tertiarybutylphenol. In such case a statistical mixture of polymers containing different terminal groups will br formed. The amounts of the various terminal groups present will depend upon the relative amounts and relative reactivities of the various chain terminating agents used.

The instant polycarbonates are high molecular weight aromatic carbonate polymers having an intrinsic viscosity, as determined in methylene chloride at 25° C., of from about 0.4 to about 1.5 dl/gm, preferably from about 0.45 to about 1.0 dl/gm. These polycarbonates generally have a weight average molecular weight of from about 15,000 to about 200,000, preferably from about 25,000 to about 100,000.

Also included within the scope of the instant invention are the high molecular weight thermoplastic randomly branched polycarbonates. These randomly branched polycarbonates may be prepared by utilizing a minor amount of a branching agent. These branching agents are well known in the art and are generally organic polyfunctional aromatic compounds containing at least three functional groups which may be hydroxyl, carboxyl, carboxylic anhydride, haloformyl, and mixtures thereof. Some illustrative non-limiting examples of these branching agents include trimellitic anhydride, trimellitic acid, trimellityl trichloride, 4-chloroformyl phthalic anhydride, pyrommelitic acid, pyromellitic dianhydride, trimesic acid, and benzophenonetetracarboxylic acid. Some other useful branching agents are disclosed in U.S. Pat. Nos. 3,635,895, 4,001,184 and 4,204,047, all of which are incorporated herein by reference.

Also included within the scope of the instant invention are the copolyester-carbonate resins which are described, inter alia, in U.S. Pat. No. 3,169,121, which is incorporated herein by reference. These copolyester-carbonates may be prepared by the reaction of (i) at least one dihydric phenol, (ii) a carbonate precursor, (iii) an end-capping amount of at least one end-capping agent of Formula V, and (iv) at least one ester-precursor selected from difunctional carboxylic acids or their ester forming reactive derivatives.

A convenient method of preparing the instant polycarbonate is the interfacial polymerization process. This process involves the coreaction of (i) at least one dihydric phenol, (ii) a carbonate precursor, and (iii) and end-capping amount of at least one end-capping agent of Formula V. The reaction is carried out in the presence of two different liquid phases which are immiscible and which consitiute two solvent media. Normally one of these liquid phases is an alkaline aqueous medium while the other liquid phase is an organic medium such as methylene chloride. Also present are catalysts which are conventionally used in the interfacial polymerization process of forming polycarbonates. These catalysts include, but are not limited to, tertiary amines such as triethylamine, quaternary ammounium compounds, and quaternary phosphonium compounds.

The temperature at which the reaction proceeds may vary from below 0° C. to above 100° C. The reaction proceeds satisfactorily from about 25° C. to about 50° C.

The end-capping agent may be present as an initial reactant, i.e., along with the dihydric phenol before the introduction of phosgene is begun, or it may be added concurrently with the introduction of the phosgene. A preferred method is one wherein the chain terminating agent of Formula V is present in the reaction mixture along with the dihydric phenol before the introduction of the carbonate precursor, such as phosgene, is begun.

The carbonate polymers of the instant invention may optionally have admixed therewith the commonly known and used additives such as antioxidants; fillers such as glass, talc, mica and clay; impact modifiers; ultraviolet radiation absorbers such as the cyanoacrylates, benzophenones, and benzotriazoles; hydrolytic stabilizers such as the epoxides disclosed in U.S. Pat. Nos. 3,489,716, 4,138,379, and 3,839,247, all of which are incorporated herein by reference; color stabilizers such as the organophosphites disclosed in U.S. Pat. Nos. 3,305,520 and 4,118,370, both of which are incorporated herein by reference; and flame retardant agents.

Some particularly useful flame retardant agents are the alkali and alkaline earth metal salts of organic sulfonic acids. These types of flame retaradant agents are disclosed, inter alia, in U.S. Pat. Nos. 3,933,734, 3,948,851, 3,926,908, 3,919,167, 3,909,490, 3,953,396, 3,931,100, 3,978,024, 3,953,399, 3,917,559, 3,951,910 and 3,940,366, all of which are incorporated herein by reference.

PREFERRED EMBODIMENT OF THE INVENTION

The following examples are presented to more fully and clearly illustrate the present invention. These examples are intended to be illustrative of rather than limiting the present invention. In the examples all parts and percentages are on a weight basis unless otherwise specified.

The following example illustrates a polycarbonate which is end-capped with a conventional prior art chain terminating agent. This example is presented for comparative purposes only.

EXAMPLE 1

To a reaction vessel there are added 280 milliliters of water, 350 milliliters of methylene chloride, 1.4 milliliter (0.01 mole) of triethylamine, 0.25 mole of bisphenol-A, and 4.6 mole percent of p-tertiarybutyl phenol chain stopper. With stirring the pH is raised to about 10 by the addition of 25% aqueous sodium hydroxide. Phosgene is introduced into the reaction mixture at the rate of 1 gram per minute for a period of 30 minutes with the pH maintained at 9.5 to 11.5 by the use of the aqueous caustic solution. The pH is adjusted to 11 at the end of the reaction. The resin layer is separated from the brine layer, washed with dilute HCl, then twice with distilled water. The resin is then precipitated with methanol.

The second order glass transition temperature (Tg) of the resin is determined using a Perkins-Elmer DSC-2B instrument which measures the Tg by differentital scanning calorimetry. The Tg is generally related to the heat distortion temperature of the resin and is an indication of the heat resistance or thermal dimensional stability of the polymer. In general, the higher the Tg the more dimensionally stable the polymer. The results are set forth in Table II.

The following examples illustrate the polycarbonates of the instant invention.

EXAMPLE 2

The procedure of Example 1 is substantially repeated except that the 4.6 mole percent of p-tertiarybutyl phenol chain stopper is replaced with 4.6 mole percent of p-1,2-cyclododecenyl phenol.

The Tg of this polymer is determined and the results are set forth in Table II.

EXAMPLE 3

The procedure of Example 1 is substantially repeated except that the 4.6 mole percent of p-tertiarybutyl phenol chain terminator is replaced with 2.5 mole percent of p-1,2-cyclohexenyl phenol.

The Tg of this polymer is determined and the results are set forth in Table II.

TABLE II

| Example No. | Tg (°C.) |
|---|---|
| 1 | 144 |
| 2 | 147 |
| 3 | 153 |

As illustrated by the data in Table II the polycarbonates of the instant invention (Examples 2 and 3) exhibit better thermal properties than polycarbonates containing conventional prior art terminal groups (Example 1). This enhancement of thermal properties, e.g., thermal resistance, allows retention of shape and dimension under load at higher temperatures.

The polycarbonates of this invention may be used in the preparation of shaped articles, molded articles, glazing materials, etc.

The foregoing detailed description of the instant invention has been given for clearness of understanding only and no unnecessary limitations are to be understood therefrom. The invention is not limited to the exact details shown and described, for obvious modifications will occur to those skilled in the art.

What is claimed is:

1. An aromatic polycarbonate containing at least one terminal group represented by the formula

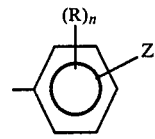

wherein:

R is independently selected from alkyl radicals;

Z represents a monounsaturated cycloalkenyl radical; and n is an integer having a value of from 0 to inclusive.

2. The polycarbonate of claim 1 wherein said cycloalkenyl radical contains from 5 to about 16 ring carbon atoms.

3. The polycarbonate of claim 2 wherein said cycloalkenyl radical is represented by the formula

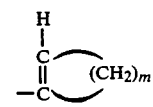

wherein m is an integer having a value of from 3 to about 14 inclusive.

4. The polycarbonate of claim 3 wherein said terminal group is represented by the formula

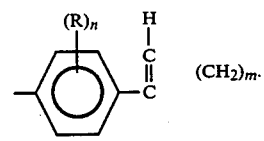

5. The polycarbonate of claim 4 wherein said cycloalkenyl radical is cyclododcenyl.

6. The polycarbonate of claim 5 wherein said terminal group is cyclododecenyl phenyl.

7. The polycarbonate of claim 4 wherein said cycloalkenyl radical is cyclohexenyl.

8. The polycarbonate of claim 7 wherein said terminal group is cyclohexenyl phenyl.

9. The polycarbonate of claim 1 which is comprised of the polymerized reaction products of (i) at least one dihydric phenol, (ii) a carbonate precursor, and (iii) an end-capping agent represented by the formula

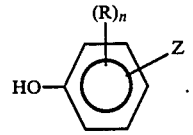

10. The polycarbonate of claim 9 wherein said cycloalkenyl radical is represented by the formula

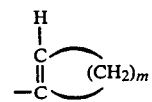

wherein m is an integer having a value of from 3 to about 14.

11. The polycarbonate of claim 10 wherein said end-capping agent is represented by the formula

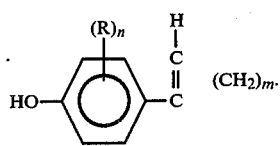
12. The polycarbonate of claim 1 wherein m is 10.
13. The polycarbonate of claim 11 wherein m is 4.
14. The polycarbonate of claim 11 wherein said carbonate precursor is phosgene.
15. The polycarbonate of claim 14 wherein said dihydric phenol is bisphenol-A.
16. The polycarbonate of claim 9 wherein said end-capping agent is present in an end-capping amount.
* * * * *